United States Patent
Li et al.

(10) Patent No.: US 12,483,940 B2
(45) Date of Patent: Nov. 25, 2025

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Haitao Li, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 399 days.

(21) Appl. No.: 18/077,973

(22) Filed: Dec. 8, 2022

(65) Prior Publication Data

US 2023/0106995 A1 Apr. 6, 2023

Related U.S. Application Data

(63) Continuation of application No. PCT/CN2020/095474, filed on Jun. 10, 2020.

(51) Int. Cl.
*H04W 36/00* (2009.01)
*H04W 36/08* (2009.01)

(52) U.S. Cl.
CPC ... *H04W 36/0058* (2018.08); *H04W 36/0085* (2018.08); *H04W 36/08* (2013.01)

(58) Field of Classification Search
CPC ........ H04W 36/0005; H04W 36/0055; H04W 36/0058; H04W 36/0061; H04W 36/0083; H04W 36/00833; H04W 36/00835; H04W 36/00837; H04W 36/0085; H04W 36/0088; H04W 36/0094
See application file for complete search history.

(56) References Cited

U.S. PATENT DOCUMENTS

| | | | |
|---|---|---|---|
| 2006/0111110 A1 | 5/2006 | Schwarz et al. | |
| 2017/0171786 A1 | 6/2017 | Mochizuki et al. | |
| 2021/0111846 A1 | 4/2021 | Lee et al. | |
| 2022/0095143 A1* | 3/2022 | Shreevastav | H04W 24/02 |

FOREIGN PATENT DOCUMENTS

| | | |
|---|---|---|
| CN | 101932046 A | 12/2010 |
| CN | 105472668 A | 4/2016 |
| CN | 109151927 A | 1/2019 |

(Continued)

OTHER PUBLICATIONS

Extended European Search Report dated Jun. 2, 2023 received in European Patent Application No. EP20940448.2.

(Continued)

*Primary Examiner* — Matthew W Genack
(74) *Attorney, Agent, or Firm* — Sheppard, Mullin, Richter & Hampton LLP

(57) ABSTRACT

The embodiments of the present disclosure provide a wireless communication method and a terminal device. The method includes: determining, by a terminal device, whether to activate neighboring cell measurement based on a measurement activation threshold and/or a cell blacklist; and determining, when the neighboring cell measurement is activated, a target cell for reselection based on a measurement result of at least one neighboring cell and the cell blacklist.

14 Claims, 5 Drawing Sheets

(56) References Cited

FOREIGN PATENT DOCUMENTS

| CN | 109391998 A | 2/2019 |
| EP | 2434806 A1 | 3/2012 |
| JP | 6697588 B1 * | 5/2020 |
| WO | 2019212224 A1 | 11/2019 |
| WO | 2020047800 A1 | 3/2020 |

OTHER PUBLICATIONS

International Search Report and Written Opinion dated Feb. 24, 2021 in International Application No. PCT/CN2020/095474. English translation attached.
Office Action issued by the European Patent Office for Application No. 20940448.2 mailed on Jun. 3, 2025.

* cited by examiner

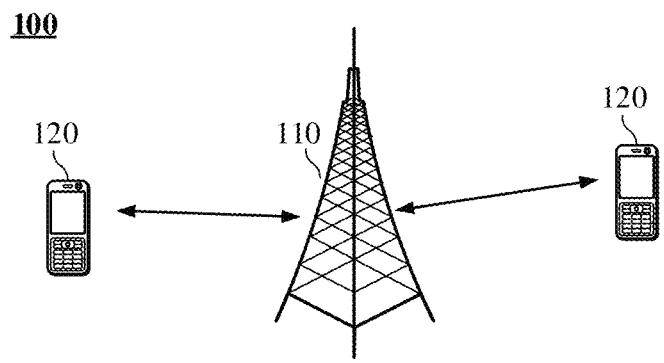

FIG. 1

```
200
```
┌─────────────────────────────────────────────────┐
│ Determine, by a terminal device, whether to activate │  S210
│ neighboring cell measurement based on a measurement │
│ activation threshold and/or a cell blacklist │
└─────────────────────────────────────────────────┘
                         ↓
┌─────────────────────────────────────────────────┐
│ Determine, by the terminal device, when the neighboring │
│ cell measurement is activated, a target cell for reselection │  S220
│ based on a measurement result of at least one neighboring │
│ cell and the cell blacklist │
└─────────────────────────────────────────────────┘

FIG. 2

WIRELESS COMMUNICATION METHOD AND TERMINAL DEVICE

CROSS-REFERENCE TO RELATED APPLICATIONS

This application is a continuation of Patent Application No. PCT/CN2020/095474 filed on Jun. 10, 2020, the entire disclosure of which is incorporated herein by reference.

TECHNICAL FIELD

The embodiments of the present disclosure relate to communication technology, and more particularly, to a wireless communication method and a terminal device.

BACKGROUND

In the related art, a terminal device can perform cell reselection based on a cell reselection measurement criterion and a cell reselection criterion. However, the cell reselection based on the above criteria often causes the terminal device to reselect a cell with high channel quality, and thus the cell may be overloaded, which degrades the system performance.

SUMMARY

The embodiments of the present disclosure provide a wireless communication method and a terminal device, capable of facilitating reselection of, or handover to, a low-load cell, thereby improving the system performance.

In a first aspect, a wireless communication method is provided. The method includes: determining, by a terminal device, whether to activate neighboring cell measurement based on a measurement activation threshold and/or a cell blacklist; and determining, when the neighboring cell measurement is activated, a target cell for reselection based on a measurement result of at least one neighboring cell and the cell blacklist.

In a second aspect, a wireless communication method is provided. The method includes: modifying, by a terminal device when a serving cell of the terminal device belongs to a cell blacklist and a neighboring cell does not belong to the cell blacklist, a measurement result of the serving cell into a first value smaller than or equal to a specific threshold; and performing, by the terminal device, measurement reporting based on the first value and a measurement result of the neighboring cell.

In a third aspect, a terminal device is provided. The terminal device is configured to perform the method according to the above first aspect or any implementation thereof.

In particular, the terminal device includes one or more functional modules configured to perform the method according to the above first aspect or any implementation thereof.

In a fourth aspect, a terminal device is provided. The terminal device is configured to perform the method according to the above second aspect or any implementation thereof.

In particular, the terminal device includes one or more functional modules configured to perform the method according to the above second aspect or any implementation thereof.

In a fifth aspect, a terminal device is provided. The terminal device includes a processor and a memory. The memory has a computer program stored thereon, and the processor is configured to invoke and execute the computer program stored in the memory to perform the method according to the above first or second aspect or any implementation thereof.

In a sixth aspect, a chip is provided. The chip is configured to perform the method according to the above first or second aspect or any implementation thereof.

In particular, the chip includes a processor configured to invoke and execute a computer program from a memory, to cause a device provided with the chip to perform the method according to the above first or second aspect or any implementation thereof.

In a seventh aspect, a computer-readable storage medium is provided. The computer-readable storage medium stores a computer program that causes a computer to perform the method according to the above first or second aspect or any implementation thereof.

In an eighth aspect, a computer program product is provided. The computer program product includes computer program instructions that cause a computer to perform the method according to the above first or second aspect or any implementation thereof.

In a ninth aspect, a computer program is provided. The computer program, when executed on a computer, causes the computer to perform the method according to the above first or second aspect or any implementation thereof.

With the technical solution in the first aspect, the terminal device considers the cell blacklist when performing cell measurement and cell reselection, which facilitates avoidance of cells in the cell blacklist and reselection of a low-load cell, thereby achieving load balancing among cells and improving the system performance.

With the technical solution in the second aspect, the terminal device considers the cell blacklist when performing cell handover, which facilitating avoidance of cells in the cell blacklist and reselection of a low-load cell, thereby achieving load balancing among cells and improving the system performance.

BRIEF DESCRIPTION OF DRAWINGS

FIG. 1 is a schematic diagram showing a communication system architecture according to an embodiment of the present disclosure.

FIG. 2 is a schematic flowchart illustrating a wireless communication method according to an embodiment of the present disclosure.

DESCRIPTION OF EMBODIMENTS

Figure 3:
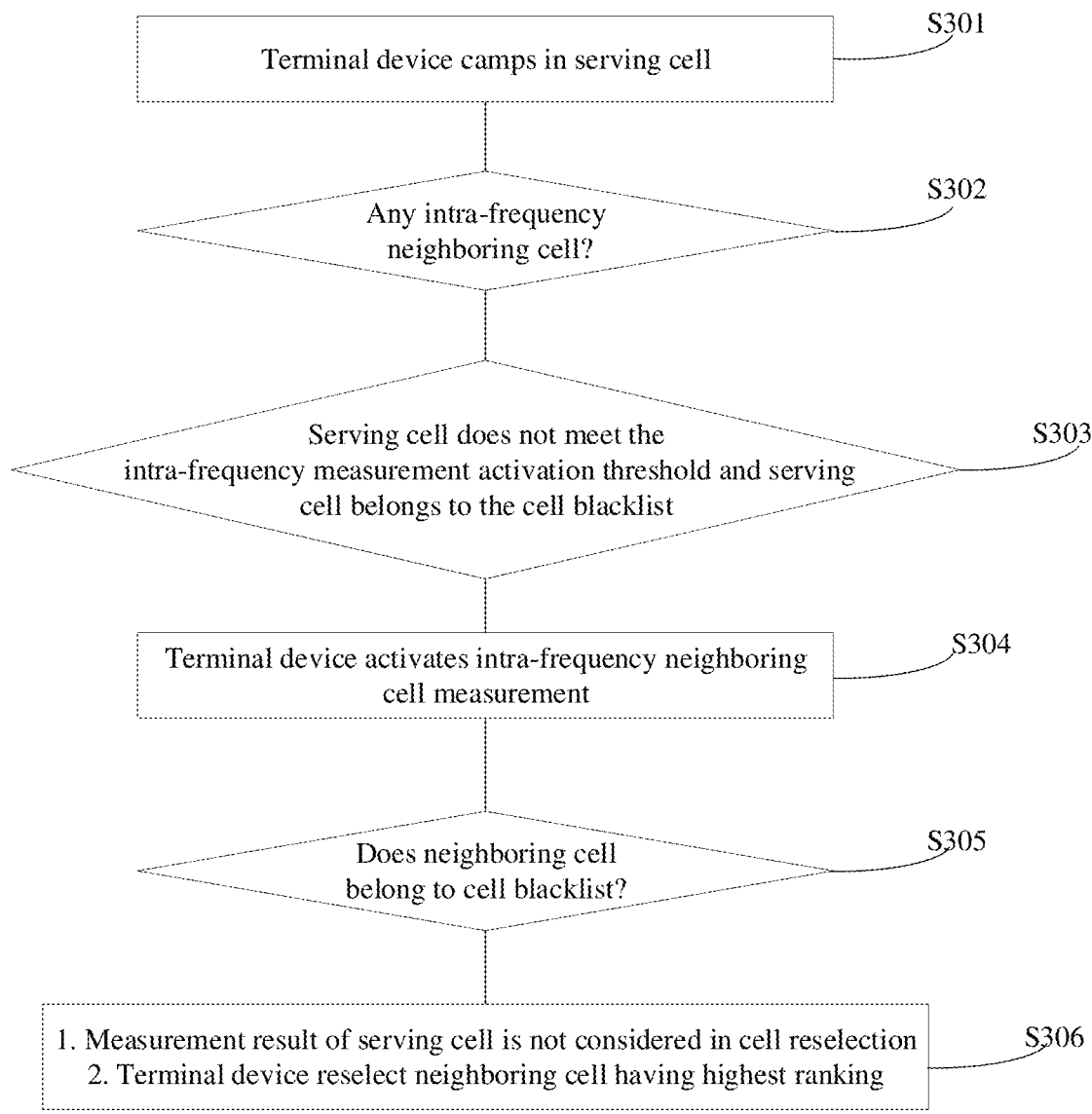
FIG. 3 is a schematic flowchart illustrating a wireless communication method according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), the next generation communication system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the embodiment of the present disclosure is not limited to any spectrum to which it is applied. For example, the embodiment of the present disclosure may be applied to licensed spectrum or unlicensed spectrum (or shared spectrum).

Exemplarily, a communication system 100 in which an embodiment of the present disclosure can be applied is schematically shown in FIG. 1. The communication system 100 may include a network device 110, which may be a device communicating with terminal devices 120 (or referred to as communication terminal or terminal). The network device 110 may provide communication coverage for a particular geographic area, and may communicate with terminal devices located within the coverage.

FIG. 1 illustratively shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal devices 120 with communication functions. The network device 110 and the terminal devices 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

It can be appreciated that, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

The embodiments of the present disclosure are described in conjunction with a terminal device and a network device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

The network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, or a network device in a future evolved PLMN.

In an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

In the related art, a terminal device can perform cell reselection based on a cell reselection measurement criterion and a cell reselection criterion. However, the cell reselection based on the above criteria often causes the terminal device to reselect a cell with high channel quality, and thus the cell may be overloaded, which degrades the system performance.

FIG. 2 is a schematic flowchart illustrating a wireless communication method 200 according to an embodiment of the present disclosure. As shown in FIG. 2, the method 200 may include, but not limited to, the following contents.

At S210, a terminal device determines whether to activate neighboring cell measurement based on a measurement activation threshold and/or a cell blacklist.

At S220, when the neighboring cell measurement is activated, a target cell for reselection is determined based on a measurement result of at least one neighboring cell and the cell blacklist.

Optionally, in some embodiments, the cell blacklist may be a blacklist determined based on load conditions of cells. For example, the cell blacklist may include cells with high loads, or cells with loads higher than a threshold, or include cells with highest loads among a plurality of cells, etc.

Optionally, the load condition of a cell may be determined based on a number of historical access users of the cell, an amount of traffic carried by the cell, etc., and the present disclosure is not limited to any of these examples.

In some embodiments, if a cell belongs to the cell blacklist, it may be considered that the load of the cell is relatively high, and load balancing needs to be performed.

Optionally, the cell blacklist may be configured by a network device, or may be obtained from a third device, for example, from a server.

For example, the network device may transmit the cell blacklist via a broadcast message. Alternatively, the network device may transmit the cell blacklist via other messages or signaling, such as Radio Resource Control (RRC) signaling, Media Access Control Control Element (MAC CE), etc., but the present disclosure is not limited to any of these examples.

In the embodiment of the present disclosure, the cell blacklist is considered when performing cell measurement and/or cell reselection, which facilitates avoidance of cells in the cell blacklist and reselection of a low-load cell, thereby achieving load balancing among cells and improving the system performance.

The cell measurement and cell reselection may include two scenarios, intra-frequency and inter-frequency. In the following, the implementation of cell measurement and cell reselection will be described in combination with these two scenarios.

Scenario 1: Intra-Frequency Scenario

In the intra-frequency scenario, the measurement activation threshold may include an intra-frequency measurement activation threshold.

In the related art, if a serving cell does not meet the intra-frequency measurement activation threshold, the terminal device does not activate intra-frequency neighboring cell measurement. In this case, if the load of the serving cell is high, user experience in the serving cell may be affected.

In an embodiment of the present disclosure, the terminal device may activate intra-frequency neighboring cell measurement when a serving cell of the terminal device does not meet the intra-frequency measurement activation threshold and the serving cell belongs to the cell blacklist, to obtain a measurement result of an intra-frequency neighboring cell.

In some other embodiments, the terminal device may activate the intra-frequency neighboring cell measurement when the serving cell belongs to the cell blacklist, i.e., regardless of whether the serving cell meets the intra-frequency measurement activation threshold;

and alternatively, in some other embodiments, the terminal device may activate the intra-frequency neighboring cell measurement when the serving cell meets the intra-frequency measurement activation threshold.

Further, it can determine which cell to be reselected based on the measurement result of the intra-frequency neighboring cell and the cell blacklist.

In particular, the terminal device may determine at least one candidate intra-frequency neighboring cell from the at least one measured intra-frequency neighboring cell. Each candidate intra-frequency neighboring cell does not belong to the cell blacklist. That is, if an intra-frequency neighboring cell belongs to the cell blacklist, the intra-frequency neighboring cell is not selected as a candidate cell for reselection. That is, the at least one candidate intra-frequency neighboring cell includes a low-load cell. Of course, the at least one candidate intra-frequency neighboring cell does not include the serving cell, so as to avoid reselection failure for the terminal device.

Further, the terminal device may select the target cell for reselection from the at least one candidate intra-frequency neighboring cell.

As an embodiment, the terminal device may rank at least one measurement result of the at least one candidate intra-frequency neighboring cell in a descending order, and the terminal device may select the intra-frequency neighboring cell having the highest ranking as the target cell. The cell having the highest ranking can be considered as the neighboring cell with the best channel quality among the at least one candidate intra-frequency neighboring cell.

Therefore, when performing cell reselection, the terminal device can select the cell with the best channel quality among the at least one low-load cell as the target cell for reselection, which facilitates load balancing among the cells and ensures reliable data transmission of the terminal device.

Optionally, in some other embodiments, the terminal device may also select, from the at least one candidate intra-frequency neighboring cell, a cell whose measurement result is higher than a threshold as the target cell, but the present disclosure is not limited to this.

Optionally, the measurement result of the serving cell may be determined based on a measurement result of a downlink reference signal transmitted by the serving cell.

Optionally, the downlink reference signal may include, but not limited to, at least one of: Synchronization Signal Block (SSB), Channel State Information Reference Signal (CSI-RS), Demodulation Reference Signal (DMRS), Sidelink Primary Synchronization Signal (PSS) or Secondary Synchronization Signal (SSS), etc. The synchronization signal may include PSS and SSS. The demodulation reference signal may include DMRS for demodulation of Physical Downlink Shared Channel (PDSCH), Physical Downlink Control Channel (PDCCH), or Physical Broadcast Channel (PBCH).

Optionally, the measurement result may be, for example, but not limited to, at least one of: Channel Quantity Indicator (CQI), Reference Signal Receiving Power (RSRP), Reference Signal Receiving Quality (RSRQ), or Signal to Interference plus Noise Ratio (SINR).

Optionally, in some embodiments, the serving cell does not meet the intra-frequency measurement activation threshold when an S value of the serving cell is greater than the intra-frequency measurement activation threshold, where the S value may refer to Srxlev (S criterion) in cell selection. For the specific implementation, reference can be made to the implementation of related technologies, and details thereof will be omitted here.

Scenario 2: Inter-Frequency Scenario

In the inter-frequency scenario, the measurement activation threshold may include an inter-frequency measurement activation threshold.

In the related art, if a serving cell does not meet the inter-frequency measurement activation threshold, the terminal device does not activate inter-frequency neighboring cell measurement. In this case, if the load of the serving cell is high, user experience in the serving cell may be affected.

In the embodiment of the present disclosure, the terminal device may activate inter-frequency neighboring cell measurement when a serving cell of the terminal device does not meet the inter-frequency measurement activation threshold and the serving cell belongs to the cell blacklist, to obtain a measurement result of an inter-frequency neighboring cell.

In some other embodiments, the terminal device may activate the inter-frequency neighboring cell measurement when the serving cell belongs to the cell blacklist, i.e., regardless of whether the serving cell meets the inter-frequency measurement activation threshold.

Alternatively, in some other embodiments, the terminal device may activate the inter-frequency neighboring cell measurement when the serving cell meets the inter-frequency measurement activation threshold.

Optionally, in some embodiments, if the serving cell does not meet the inter-frequency measurement activation threshold, reference may be made to the relevant implementation in the cell reselection criterion, and details thereof will be omitted here.

Further, it can determine which inter-frequency cell to be reselected based on the measurement result of the inter-frequency neighboring cell and the cell blacklist.

In particular, the terminal device may determine at least one candidate inter-frequency neighboring cell from the at least one measured inter-frequency neighboring cell. Each candidate inter-frequency neighboring cell does not belong to the cell blacklist. That is, if an inter-frequency neighboring cell belongs to the cell blacklist, the inter-frequency neighboring cell is not selected as a candidate cell for reselection. That is, the at least one candidate inter-frequency neighboring cell includes a low-load cell.

Further, the terminal device may select the target cell for reselection from the at least one candidate inter-frequency neighboring cell.

In some embodiments, the terminal device may determine the target cell from the least one candidate inter-frequency neighboring cell based on a priority of the at least one candidate inter-frequency neighboring cell.

Case 1: The priority of the at least one candidate inter-frequency neighboring cell is same as the priority of the serving cell. This case is similar to the cell reselection scenario of the intra-frequency neighboring cell.

As an example, the terminal device may rank at least one measurement result of the at least one candidate inter-frequency neighboring cell in a descending order, and the terminal device may select the inter-frequency neighboring cell having the highest ranking as the target cell. The cell having the highest ranking can be considered as the neighboring cell with the best channel quality among the at least one candidate inter-frequency neighboring cell.

As another example, the terminal device may select, from the at least one candidate inter-frequency neighboring cell, a cell whose measurement result is greater than a threshold as the target cell, but the present disclosure is not limited to this.

Case 2: The priority of the at least one candidate inter-frequency neighboring cell is higher than the priority of the serving cell.

In this case, the terminal device may select, from the at least one candidate inter-frequency neighboring cell, an inter-frequency neighboring cell whose measurement result meets the cell selection criterion as the target cell. The cell selection criterion here is also referred to as a cell reselection criterion, and for the specific implementation, reference can be made to the related art, and details thereof will be omitted here.

Optionally, as an example, the terminal device may select, from the at least one candidate inter-frequency neighboring cell, an inter-frequency neighboring cell with the highest priority as the target cell.

Case 3: The priority of the at least one candidate inter-frequency neighboring cell is lower than the priority of the serving cell.

As an example, from the at least one candidate inter-frequency neighboring cell, an inter-frequency neighboring cell whose measurement result meets a low-priority reselection threshold is selected as the target cell.

As yet another example, when the measurement result of the serving cell is smaller than or equal to a threshold (denoted as ThrshServLow) and the measurement result of the low-priority inter-frequency neighboring cell is greater than or equal to a threshold (denoted as ThrshServLow), the terminal device can select the low-priority inter-frequency neighboring cell as the target cell.

Optionally, in the above embodiment, the terminal device may perform cell reselection based on a duration of the cell, in addition to based on the measurement result of the cell. For example, for low-priority cell reselection, in addition to requiring the measurement result of the low-priority inter-frequency neighboring cell to be greater than or equal to the threshold, the duration of the measurement result is required to exceed a time threshold.

Therefore, when performing cell reselection, the terminal device can select a cell with a high priority from the low-load cells as the target cell for reselection, which facilitates load balancing among the cells and ensures reliable data transmission of the terminal device.

The specific process flows of the above two scenarios will be described below with reference to FIG. 3 and FIG. 4.

For the intra-frequency scenario, as shown in FIG. 3, the following steps may be included.

At S301, a terminal device camps in a serving cell.

At S302, the terminal device determines whether there is an intra-frequency neighboring cell.

If there is an intra-frequency neighboring cell, the process proceeds with S303.

At S303, it is determined whether the serving cell does not meet the intra-frequency measurement activation threshold and the serving cell belongs to the cell blacklist.

If so, the process proceeds with S304. Otherwise, the intra-frequency neighboring cell measurement is not activated.

At S304, the terminal device activates the intra-frequency neighboring cell measurement.

At S305, it is determined whether the measured intra-frequency neighboring cell belongs to the cell blacklist.

At S306, a target cell is selected from at least one intra-frequency neighboring cell that does not belong to the blacklist.

That is, the measurement result of the serving cell is not considered in cell reselection.

As a specific example, the terminal device may rank at least one measurement result of the at least one intra-frequency neighboring cell in a descending order, and the terminal device may select the intra-frequency neighboring cell having the highest ranking as the target cell. That is, the terminal device can reselect the neighboring cell having the highest ranking.

Figure 4:
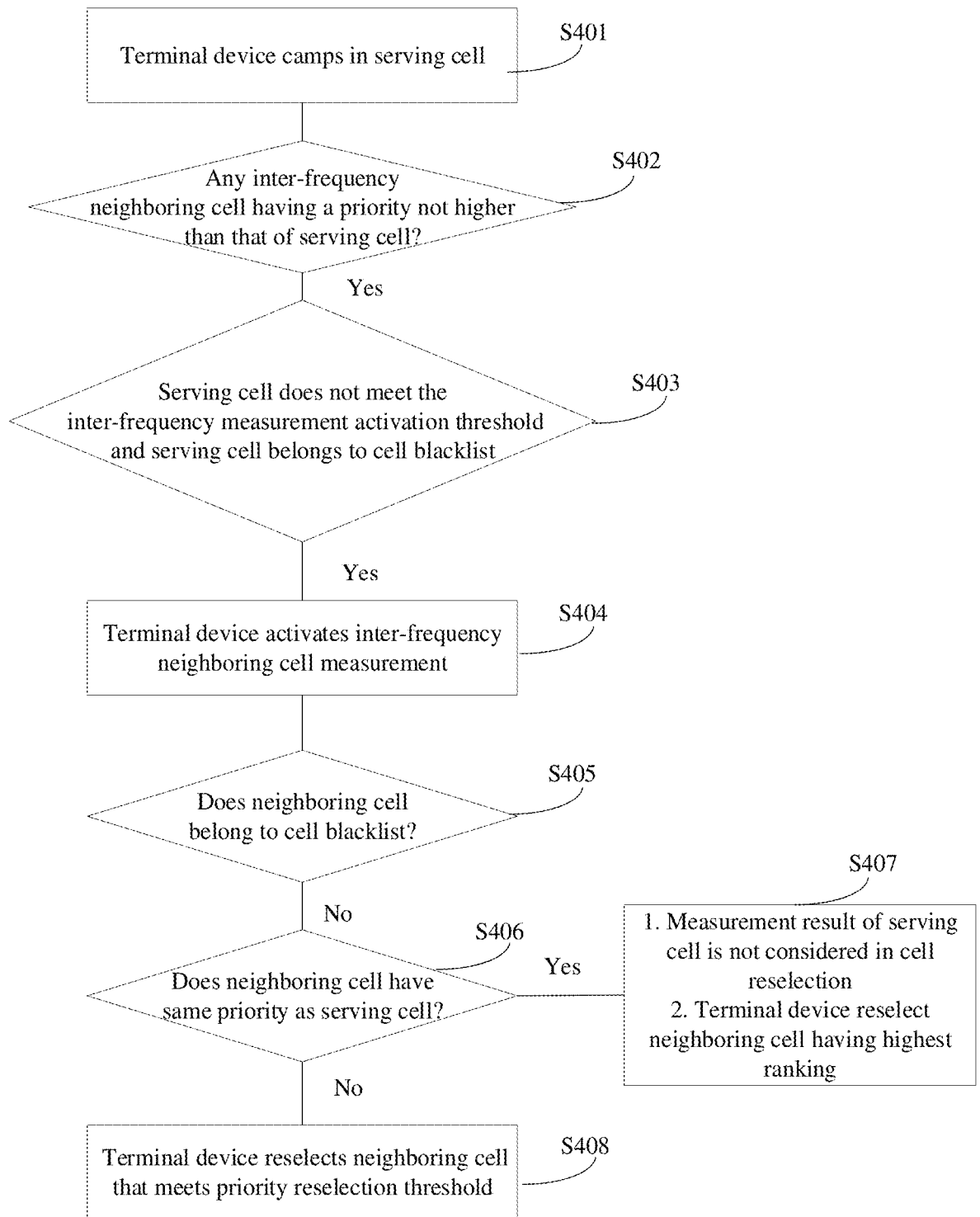
FIG. 4 is a schematic flowchart illustrating a wireless communication method according to another embodiment of the present disclosure.

For the inter-frequency scenario, as shown in FIG. 4, the following steps may be included.

At S401, a terminal device camps in a serving cell.

At S402, the terminal device determines whether there is an inter-frequency neighboring cell and the priority of the inter-frequency neighboring cell is not higher than the priority of the serving cell.

If so, the process proceeds with S403.

At S403, it is determined whether the serving cell does not meet the inter-frequency measurement activation threshold and the serving cell belongs to the cell blacklist.

If so, the process proceeds with S404. Otherwise, the inter-frequency neighboring cell measurement is not activated.

At S404, the terminal device activates the inter-frequency neighboring cell measurement.

At S405, it is determined whether the measured inter-frequency neighboring cell belongs to the cell blacklist.

At S406, from at least one inter-frequency neighboring cell that does not belong to the blacklist, it is determined whether the priority of the at least one inter-frequency neighboring cell is same as the priority of the serving cell.

If so, the process proceeds with S407, or otherwise the process proceeds with S408.

At S407, from the at least one inter-frequency neighboring cell that does not belong to the blacklist, a target cell is selected based on at least one measurement result of the at least one inter-frequency neighboring cell.

That is, the measurement result of the serving cell is not considered in cell reselection.

As a specific example, the terminal device may rank at least one measurement result of the at least one inter-frequency neighboring cell in a descending order, and the terminal device may select the intra-frequency neighboring cell having the highest ranking as the target cell. That is, the terminal device can reselect the neighboring cell having the highest ranking.

At S408: a target cell is selected based on the priority of the at least one inter-frequency neighboring cell and a priority reselection threshold.

As an example, the inter-frequency neighboring cell with a priority meeting a low-priority reselection threshold may be selected as the target cell.

Figure 5:
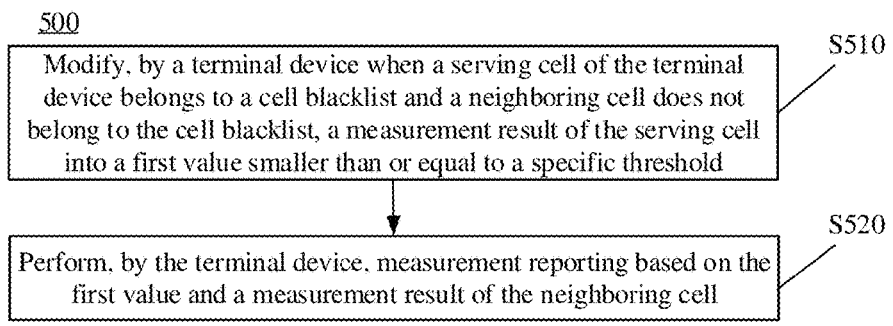
FIG. 5 is a schematic flowchart illustrating a wireless communication method according to another embodiment of the present disclosure.

FIG. 5 is a schematic flowchart illustrating a wireless communication method 500 according to an embodiment of the present disclosure. As shown in FIG. 5, the method 500 may include, but not limited to, the following contents.

At S510, when a serving cell of a terminal device belongs to a cell blacklist and a neighboring cell does not belong to the cell blacklist, the terminal device modifies a measurement result of the serving cell into a first value smaller than or equal to a specific threshold.

At S520, the terminal device performs measurement reporting based on the first value and a measurement result of the neighboring cell.

Optionally, in some embodiments, the cell blacklist may be a blacklist determined based on load conditions of cells. For example, the cell blacklist may include cells with high loads, or cells with loads higher than a threshold, or include cells with highest loads among a plurality of cells, etc.

Optionally, the load condition of a cell may be determined based on a number of historical access users of the cell, an amount of traffic carried by the cell, etc., and the present disclosure is not limited to any of these examples.

In some embodiments, if a cell belongs to the cell blacklist, it may be considered that the load of the cell is relatively high, and load balancing needs to be performed.

Optionally, the cell blacklist may be configured by a network device, or may be obtained from a third device, for example, from a server.

For example, the network device may transmit the cell blacklist via a broadcast message. Alternatively, the network device may transmit the cell blacklist via other messages or signaling, such as Radio Resource Control (RRC) signaling, Media Access Control Control Element (MAC CE), etc., but the present disclosure is not limited to any of these examples.

In the embodiments of the present disclosure, the cell blacklist is considered when performing cell handover, which facilitates avoidance of cells in the cell blacklist and handover to a low-load cell, thereby achieving load balancing among cells and improving the system performance.

In the related art, if the channel quality of the serving cell is relatively high, measurement reporting is usually not triggered, and cell handover cannot be triggered. In this case, if the load of the serving cell is high, the user experience in the serving cell may be affected.

The serving cell belonging to the cell blacklist and the neighboring cell not belonging to the cell blacklist means that the serving cell has a high load and the neighboring cell has a low load. In this case, if the channel quality of the serving cell is relatively high, the terminal device will not perform measurement reporting. In the embodiment of the present disclosure, the terminal device may modify the measurement result of the serving cell to a lower value, such as a first value which may be smaller than or equal to a specific threshold. A measurement result smaller than the specific threshold will trigger measurement reporting.

Optionally, the specific threshold may be a minimum value of cell measurement results, such as −128 dB, or the specific threshold may be predefined, or configured by a network device.

Further, the terminal device can determine a measurement event, e.g., a measurement event A2, based on the modified measurement result, i.e., the first value. That is, the terminal device can determine whether the first value is lower than a threshold. Since the first value is sufficiently low, reporting of the measurement event A2 will be triggered.

Further, the network device may configure the terminal device with related configurations for reporting measurement events A3 and A5. For example, a first offset for the measurement event A3, and two thresholds for the measurement event A5.

Therefore, the terminal device can determine the measurement event A3 or A5 based on the modified measurement result of the serving cell and the measurement result of the neighboring cell. Since the first value is sufficiently low, the reporting of the measurement event A3 or A5 will be triggered generally.

For example, if the measurement result of the neighboring cell is higher than the first value by a first offset, the terminal device can report the measurement event A3 to the network device; or if the measurement result of the neighboring cell is higher than a second threshold, and the first value is lower than a third threshold, the terminal device can report the measurement event A5 to the network device.

Further, the network device can select the target cell for handover for the terminal device based on the measurement event reported by the terminal device, such that the terminal device can be handed over from a high-load serving cell to a low-load neighboring cell, thereby achieving load balancing among cells and improving the system performance.

A specific process flow of the wireless communication method will be described below with reference to FIG. 6.

Figure 6:
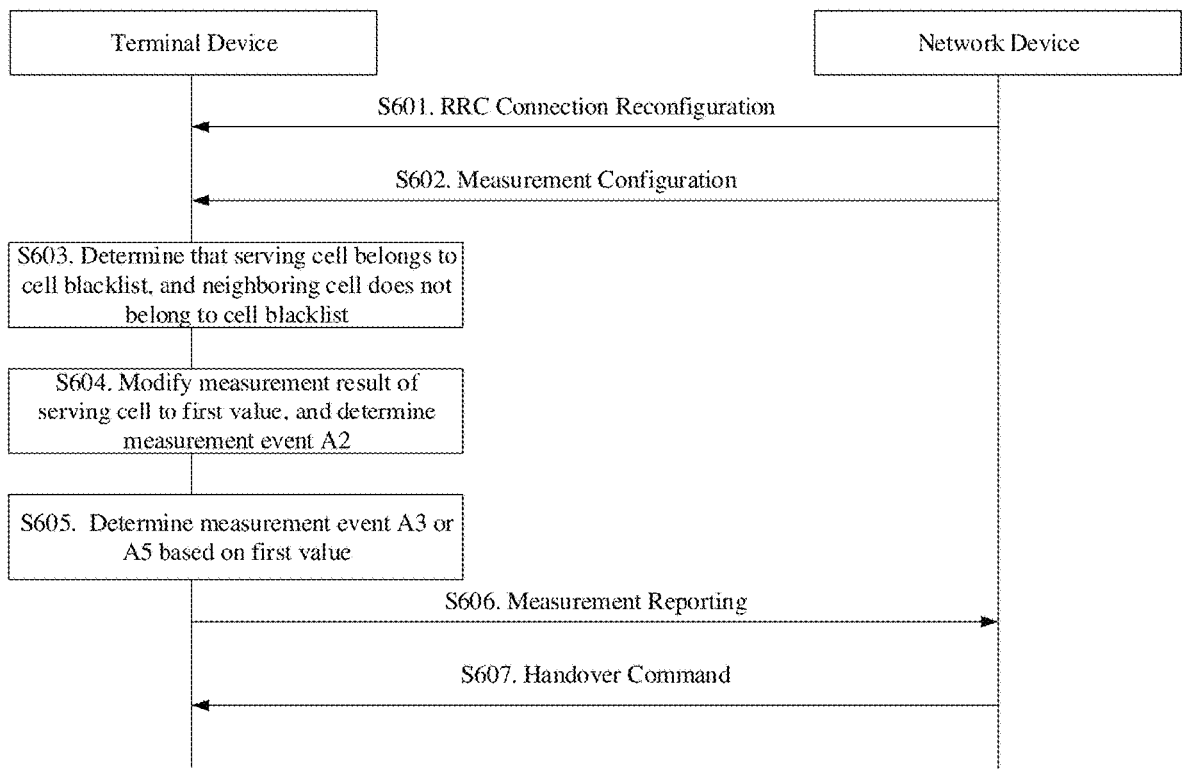
FIG. 6 is a schematic flowchart illustrating a wireless communication method according to another embodiment of the present disclosure.

As shown in FIG. 6, the following steps may be included.

At S601, a network device transmits a Radio Resource Control (RRC) connection reconfiguration message to a terminal device.

At S602, the network device transmits a measurement configuration to the terminal device.

At S603, the terminal device determines that a serving cell belongs to a cell blacklist, and a neighboring cell does not belong to the cell blacklist.

Further, at S604, the terminal device modifies a measurement result of the serving cell to a first value, then determines a measurement event A2, and triggers reporting of the measurement event A2.

At S605, the terminal device determines a measurement event A3 or A5 based on the modified measurement result of the serving cell and the measurement result of the neighboring cell.

Further, at S606, the measurement event A3 or A5 is reported.

Therefore, the network device can select an appropriate cell for the terminal device to perform cell handover based on the measurement report of the terminal device.

At S607, the terminal device may receive a handover command from the network device, and may further perform cell handover according to the handover command.

Optionally, the handover command may include information on a target cell of the handover.

The method embodiments of the present disclosure have been described in detail above with reference to FIGS. 2 to 6, and the apparatus embodiments of the present disclosure will be described in detail below with reference to FIGS. 7 to 10. It should be understood that the apparatus embodiments and the method embodiments correspond to each other, and for similar description, reference can be made to the method embodiments.

Figure 7:
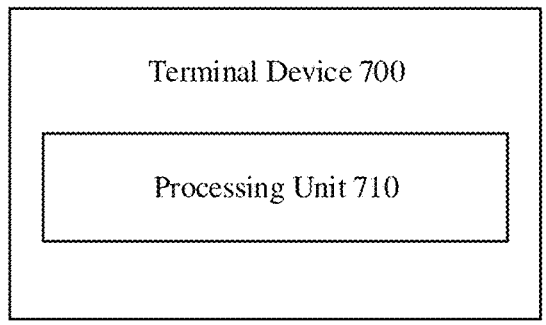
FIG. 7 is a schematic block diagram of a terminal device according to an embodiment of the present disclosure.

FIG. 7 shows a schematic block diagram of a terminal device 700 according to an embodiment of the present disclosure. As shown in FIG. 7, the terminal device 700 includes:

a processing unit 710 configured to determine whether to activate neighboring cell measurement based on a measurement activation threshold and/or a cell blacklist; and determine, when the neighboring cell measurement is activated, a target cell for reselection based on a measurement result of at least one neighboring cell and the cell blacklist.

Optionally, in some embodiments, the measurement activation threshold may include an intra-frequency measurement activation threshold, and the processing unit 710 may be configured to:

activate intra-frequency neighboring cell measurement when a serving cell of the terminal device does not meet the intra-frequency measurement activation threshold and the serving cell belongs to the cell blacklist.

Optionally, in some embodiments, the serving cell not meeting the intra-frequency measurement activation threshold may include a measurement result of the serving cell being higher than the intra-frequency measurement activation threshold.

Optionally, in some embodiments, the processing unit 710 may be further configured to:

determine at least one candidate intra-frequency neighboring cell from the at least one measured intra-frequency neighboring cell, each candidate intra-frequency neighboring cell not belonging to the cell blacklist; and select the target cell from the at least one candidate intra-frequency neighboring cell.

Optionally, in some embodiments, the processing unit 710 may be further configured to:

determine, from the at least one candidate intra-frequency neighboring cell, an intra-frequency neighboring cell having a highest ranking as the target cell, at least one measurement result of the at least one candidate intra-frequency neighboring cell being ranked in a descending order.

Optionally, in some embodiments, the measurement activation threshold may include an inter-frequency measurement activation threshold, and the processing unit 710 may be further configured to:

activate inter-frequency neighboring cell measurement when a serving cell of the terminal device does not meet the inter-frequency measurement activation threshold and the serving cell belongs to the cell blacklist.

Optionally, in some embodiments, the serving cell not meeting the inter-frequency measurement activation threshold may include a measurement result of the serving cell being higher than the inter-frequency measurement activation threshold.

Optionally, in some embodiments, the processing unit 710 may be further configured to:

determine at least one candidate inter-frequency neighboring cell from the at least one measured inter-frequency neighboring cell, each candidate inter-frequency neighboring cell not belonging to the cell blacklist; and determine the target cell from the least one candidate inter-frequency neighboring cell based on a priority of the at least one candidate inter-frequency neighboring cell.

Optionally, in some embodiments, the processing unit 710 may be further configured to:

select, from the at least one candidate inter-frequency neighboring cell, an inter-frequency neighboring cell having a highest ranking as the target cell when the priority of the at least one candidate inter-frequency neighboring cell is same as a priority of the serving cell, at least one measurement result of the at least one candidate inter-frequency neighboring cell being ranked in a descending order.

Optionally, in some embodiments, the processing unit 710 may be further configured to:

select, from the at least one candidate inter-frequency neighboring cell, an inter-frequency neighboring cell whose measurement result meets a low-priority reselection threshold as the target cell when the priority of the at least one candidate inter-frequency neighboring cell is lower than the priority of the serving cell; or select, from the at least one candidate inter-frequency neighboring cell, an inter-frequency neighboring cell whose measurement result meets a cell selection criterion as the target cell when the priority of the at least one candidate inter-frequency neighboring cell is higher than the priority of the serving cell.

Optionally, in some embodiments, the cell blacklist may indicate at least one cell having a load higher than a specific threshold.

Optionally, in some embodiments, the cell blacklist may be configured by a network device or obtained from a server.

Optionally, in some embodiments, the cell blacklist may be carried in a broadcast message from the network device.

It can be appreciated that the terminal device 700 according to the embodiment of the present disclosure may correspond to the terminal device in the method embodiment of the present disclosure, and the above and other operations and/or functions of each unit in the terminal device 700 are provided for implementing the corresponding processes of the terminal device in the method shown in FIGS. 2 to 4. For the sake of brevity, details thereof will be omitted here.

Figure 8:
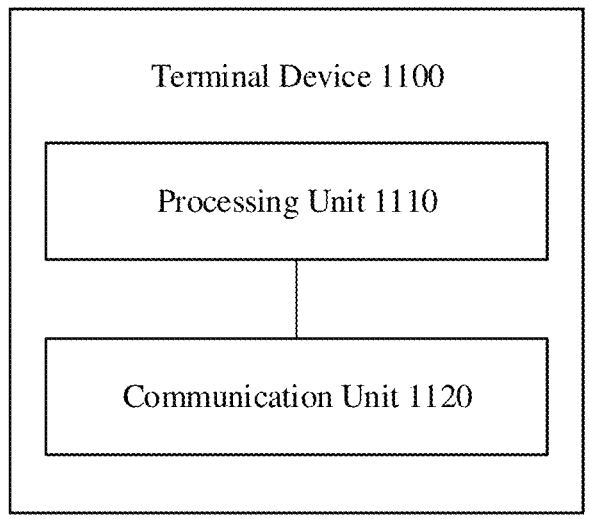
FIG. 8 is a schematic block diagram of a terminal device according to an embodiment of the present disclosure.

FIG. 8 shows a schematic block diagram of a terminal device 1100 according to an embodiment of the present disclosure. As shown in FIG. 8, the terminal device 1100 includes:

a processing unit 1110 configured to modify, when a serving cell of the terminal device belongs to a cell blacklist and a neighboring cell does not belong to the cell blacklist, a measurement result of the serving cell into a first value smaller than or equal to a specific threshold; and a communication unit 1120 configured to perform measurement reporting based on the first value and a measurement result of the neighboring cell.

Optionally, in some embodiments, the specific threshold may be a minimum value of cell measurement results, or the specific threshold may be predefined, or configured by a network device.

Optionally, in some embodiments, the communication unit 1120 may be further configured to:

report a measurement event A2 to a network device when the first value is lower than a first threshold.

Optionally, in some embodiments, the communication unit 1120 may be further configured to:

report a measurement event A3 to a network device when the measurement result of the neighboring cell is higher than the first value by a first offset; or report a measurement event A5 to the network device when the measurement result of the neighboring cell is higher than a second threshold and the first value is lower than a third threshold.

Optionally, in some embodiments, the cell blacklist may indicate at least one cell having a load higher than a specific threshold.

Optionally, in some embodiments, the cell blacklist may be configured by a network device or obtained from a server.

Optionally, in some embodiments, the cell blacklist may be carried in a broadcast message from the network device.

Optionally, in some embodiments, the above communication unit may be a communication interface or a transceiver, or an input/output interface of a communication chip or a system-on-chip. The above processing unit may be one or more processors.

It should be understood that the terminal device 1100 according to the embodiment of the present disclosure may correspond to the terminal device in the method embodiment of the present disclosure, and the above and other operations and/or functions of the respective units in the terminal device 1100 are provided for the purpose of implementing the process flow corresponding to the terminal device in the methods shown in FIGS. 5 and 6, and details thereof will be not omitted here for brevity.

Figure 9:
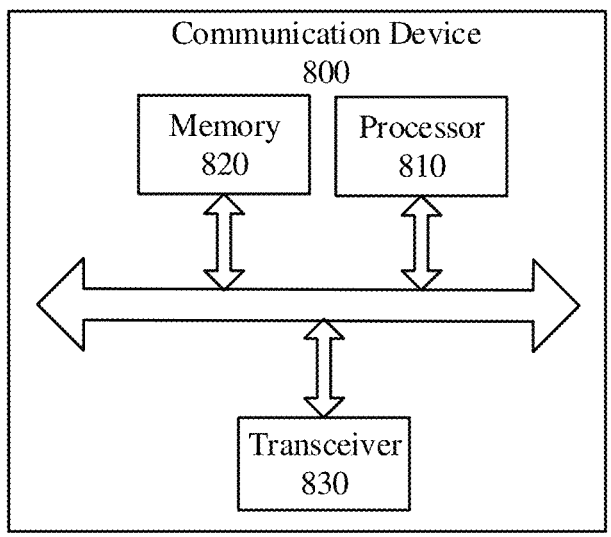
FIG. 9 is a schematic block diagram of a communication device according to an embodiment of the present disclosure.

FIG. 9 is a schematic diagram showing a structure of a communication device 800 according to an embodiment of the present disclosure. The communication device 800 shown in FIG. 9 includes a processor 810, and the processor 810 can invoke and execute a computer program from a memory to implement the method in the embodiment of the present disclosure.

Optionally, as shown in FIG. 9, the communication device 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

Optionally, as shown in FIG. 9, the communication device 800 may further include a transceiver 830, and the processor 810 may control the transceiver 830 to communicate with other devices, and in particular, transmit information or data to other devices, or receive information or data transmitted by other devices.

Here, the transceiver 830 may include a transmitter and a receiver. The transceiver 830 may further include one or more antennas.

Optionally, the communication device 800 may specifically be the network device according to the embodiment of the present disclosure, and the communication device 800 may implement the corresponding processes implemented by the network device in any of the methods according to the embodiments of the present disclosure. For the sake of brevity, details thereof will be omitted here.

Optionally, the communication device 800 may specifically be the mobile terminal/terminal device according to the embodiment of the present disclosure, and the communication device 800 may implement the corresponding processes implemented by the mobile terminal/terminal device in any of the methods according to the embodiments of the present disclosure. For the sake of brevity, details thereof will be omitted here.

Figure 10:
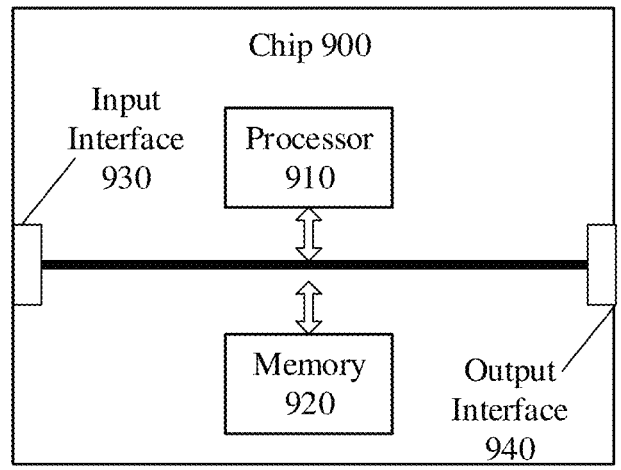
FIG. 10 is a schematic block diagram of a chip according to an embodiment of the present disclosure.

FIG. 10 is a schematic diagram showing a structure of a chip according to an embodiment of the present disclosure. The chip 900 shown in FIG. 10 includes a processor 910, and the processor 910 can invoke and execute a computer program from a memory to implement the method in the embodiment of the present disclosure.

Optionally, as shown in FIG. 10, the chip 900 may further include a memory 920. The processor 910 can invoke and execute a computer program from the memory 920 to implement the method in the embodiment of the present disclosure.

The memory 920 may be a separate device independent from the processor 910, or may be integrated in the processor 910.

Optionally, the chip 900 may further include an input interface 930. The processor 910 can control the input interface 930 to communicate with other devices or chips, and in particular, obtain information or data transmitted by other devices or chips.

Optionally, the chip 900 may further include an output interface 940. The processor 910 can control the output interface 940 to communicate with other devices or chips, and in particular, output information or data to other devices or chips.

Optionally, the chip 900 can be applied to the network device in the embodiment of the present disclosure, and the chip 900 can implement the corresponding processes implemented by the network device in the various methods of the embodiments of the present disclosure. For the sake of brevity, details thereof will be omitted here.

Optionally, the chip 900 can be applied to the mobile terminal/terminal device in the embodiment of the present disclosure, and the chip 900 can implement the corresponding processes implemented by the mobile terminal/terminal device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

A communication system is also provided according to an embodiment of the present disclosure. The communication system includes a terminal device and a network device. Here, the terminal device can be configured to implement the corresponding functions implemented by the terminal device in the above method, and the network device can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
   determining, by a terminal device, whether to activate neighboring cell measurement based on a measurement activation threshold and a cell blacklist; and
   determining, when the neighboring cell measurement is activated, a target cell for reselection based on a measurement result of at least one neighboring cell and the cell blacklist,
   wherein the measurement activation threshold comprises an intra-frequency measurement activation threshold, and said determining, by the terminal device, whether to activate the neighboring cell measurement based on the measurement activation threshold and the cell blacklist comprises:
   activating, by the terminal device, intra-frequency neighboring cell measurement when a serving cell of the terminal device does not meet the intra-frequency measurement activation threshold and the serving cell belongs to the cell blacklist;
   or,
   the measurement activation threshold comprises an inter-frequency measurement activation threshold, and said determining, by the terminal device, whether to activate the neighboring cell measurement based on the measurement activation threshold and the cell blacklist comprises:
   activating, by the terminal device, inter-frequency neighboring cell measurement when a serving cell of the terminal device does not meet the inter-frequency measurement activation threshold and the serving cell belongs to the cell blacklist.

2. The method according to claim 1, wherein the cell blacklist indicates at least one cell having a load higher than a specific threshold.

3. The method according to claim 1, wherein the cell blacklist is configured by a network device or obtained from a server.

4. A terminal device, comprising a processor and a memory, wherein the memory has a computer program stored thereon, and the processor is configured to invoke and execute the computer program stored in the memory to:
- determine whether to activate neighboring cell measurement based on a measurement activation threshold and a cell blacklist; and
- determine, when the neighboring cell measurement is activated, a target cell for reselection based on a measurement result of at least one neighboring cell and the cell blacklist,
- wherein the measurement activation threshold comprises an intra-frequency measurement activation threshold, and the processor is configured to invoke and execute the computer program stored in the memory to:
- activate intra-frequency neighboring cell measurement when a serving cell of the terminal device does not meet the intra-frequency measurement activation threshold and the serving cell belongs to the cell blacklist;
- or,
- the measurement activation threshold comprises an inter-frequency measurement activation threshold, and the processor is configured to invoke and execute the computer program stored in the memory to:
- activate inter-frequency neighboring cell measurement when a serving cell of the terminal device does not meet the inter-frequency measurement activation threshold and the serving cell belongs to the cell blacklist.

5. The terminal device according to claim 4, wherein the cell blacklist indicates at least one cell having a load higher than a specific threshold.

6. The terminal device according to claim 4, wherein the cell blacklist is configured by a network device or obtained from a server.

7. The method according to claim 1, wherein the serving cell not meeting the intra-frequency measurement activation threshold comprises a measurement result of the serving cell being higher than the intra-frequency measurement activation threshold.

8. The method according to claim 7, wherein said determining the target cell for reselection based on the measurement result of the at least one neighboring cell and the cell blacklist comprises:
- determining, by the terminal device, at least one candidate intra-frequency neighboring cell from the at least one measured intra-frequency neighboring cell, each candidate intra-frequency neighboring cell not belonging to the cell blacklist; and
- selecting the target cell from the at least one candidate intra-frequency neighboring cell.

9. The method according to claim 8, wherein said selecting the target cell from the at least one candidate intra-frequency neighboring cell comprises:
- determining, from the at least one candidate intra-frequency neighboring cell, an intra-frequency neighboring cell having a highest ranking as the target cell, at least one measurement result of the at least one candidate intra-frequency neighboring cell being ranked in a descending order.

10. The method according to claim 1, wherein the serving cell not meeting the inter-frequency measurement activation threshold comprises a measurement result of the serving cell being higher than the inter-frequency measurement activation threshold.

11. The method according to claim 10, wherein said determining the target cell for reselection based on the measurement result of the at least one neighboring cell and the cell blacklist comprises:
- determining at least one candidate inter-frequency neighboring cell from the at least one measured inter-frequency neighboring cell, each candidate inter-frequency neighboring cell not belonging to the cell blacklist; and
- determining the target cell from the least one candidate inter-frequency neighboring cell based on a priority of the at least one candidate inter-frequency neighboring cell.

12. The method according to claim 11, wherein said determining the target cell from the least one candidate inter-frequency neighboring cell based on the priority of the at least one candidate inter-frequency neighboring cell comprises:
- selecting, from the at least one candidate inter-frequency neighboring cell, an inter-frequency neighboring cell having a highest ranking as the target cell when the priority of the at least one candidate inter-frequency neighboring cell is same as a priority of the serving cell, at least one measurement result of the at least one candidate inter-frequency neighboring cell being ranked in a descending order.

13. The method according to claim 11, wherein said determining the target cell from the least one candidate inter-frequency neighboring cell based on the priority of the at least one candidate inter-frequency neighboring cell comprises:
- selecting, from the at least one candidate inter-frequency neighboring cell, an inter-frequency neighboring cell whose measurement result meets a low-priority reselection threshold as the target cell when the priority of the at least one candidate inter-frequency neighboring cell is lower than a priority of the serving cell; or
- selecting, from the at least one candidate inter-frequency neighboring cell, an inter-frequency neighboring cell whose measurement result meets a cell selection criterion as the target cell when the priority of the at least one candidate inter-frequency neighboring cell is higher than the priority of the serving cell.

14. The method according to claim 3, wherein the cell blacklist is carried in a broadcast message from the network device.

* * * * *